H. LILL.
PHOTOGRAPHIC APPARATUS.
APPLICATION FILED JULY 25, 1910.
1,030,737.
Patented June 25, 1912.
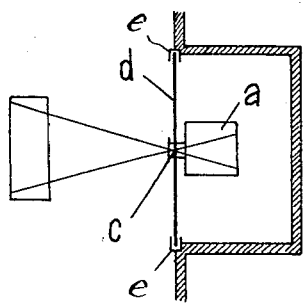
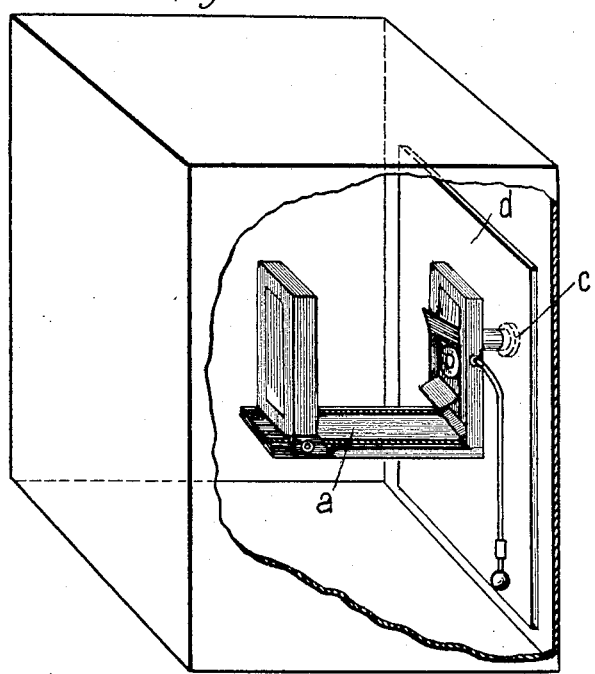

UNITED STATES PATENT OFFICE.

HUBERT LILL, OF MANNHEIM, GERMANY.

PHOTOGRAPHIC APPARATUS.

1,030,737. Specification of Letters Patent. Patented June 25, 1912.

Application filed July 25, 1910. Serial No. 573,770.

*To all whom it may concern:*

Be it known that I, HUBERT LILL, hof-photograph, a citizen of the German Empire, residing at Mannheim, Baden, Germany, have invented certain new and useful Improvements in Photographic Apparatus, of which the following is a specification.

The object of the present invention is to provide an apparatus for photographic purposes by which the person to be photographed may have visual knowledge of the pose in which he has been placed.

According to this invention a mirror impervious to light is fitted to the front of a closed casing or cabinet and is connected with the camera or its objective in such a manner that the objective registers constantly with an opening in the mirror, and is forced to move with the mirror should the mirror be adjusted in a vertical plane. As the camera is within a closed space, the person to be photographed is not distracted or disturbed by the movements of the operator. As the mirror is not transparent, the camera space may be used at the same time as a dark room for changing plates, and the camera operated in the well known manner without a bellows or curtain. Moreover, the cabinet, according to the present invention, can be placed according to the requirement of any particular circumstances at any desired point in the studio.

In the accompanying drawings, Figure 1 is a view partly in section and partly in diagram of my invention. Fig. 2 is a perspective view showing a different form of camera.

The character *a* in the drawing designates a camera which is shown diametrically in Fig. 1, and may be of any desired size or form. The camera is placed in a closed space having its front covered by an opaque mirror *d*, the objective *c* of the camera passing through the mirror and being connected thereto in such manner that the objective must necessarily follow the movement of the mirror. The mirror is mounted in vertical grooves *e* in the wall of the cabinet, so that it may be adjusted to any desired height at which it is intended to use the camera.

The mirror may be fitted within the grooves so as to be held at the desired height frictionally or, if preferred, counter-balancing means may be provided to support the weight of the mirror and the camera. However, ordinarily the mirror will be sufficiently supported from the camera stand which is usually telescopic or vertically adjustable.

In Fig. 2 the camera is shown without the inclosing curtain or bellows, which is unnecessary inasmuch as the camera is arranged within an inclosed space into which no light may enter.

It will be readily seen from the foregoing description that I have provided an apparatus in which the person posed before the camera may have a perfect conception of the pose in which he has been placed and after being posed will not be distracted by the movements of the operator. The apparatus will therefore be found especially desirable in taking pictures of children. Inasmuch as the cabinet is preferably portable, it is not necessary to utilize the gloomy and unattractive camera space which has heretofore been employed.

Having thus described my invention, what I claim as new and desire to secure by Letters-Patent is:

1. A photographic apparatus comprising a closed cabinet, a camera within the cabinet having its objective extending through one wall of the cabinet, and an opaque mirror mounted on the wall of the cabinet and fixed to and surrounding the objective of the camera.

2. A photographic apparatus comprising a cabinet having vertical grooves in one wall, an opaque mirror engaging said grooves and movable vertically therein, and a camera within the cabinet having its objective extending through and fixed to the mirror.

Dated this 8th day of July 1910.

In testimony whereof I affix my signature, in presence of two witnesses.

HUBERT LILL.

Witnesses:
R. WENTZEL,
CURT KLIEMANN.